United States Patent Office 2,730,904
Patented Jan. 17, 1956

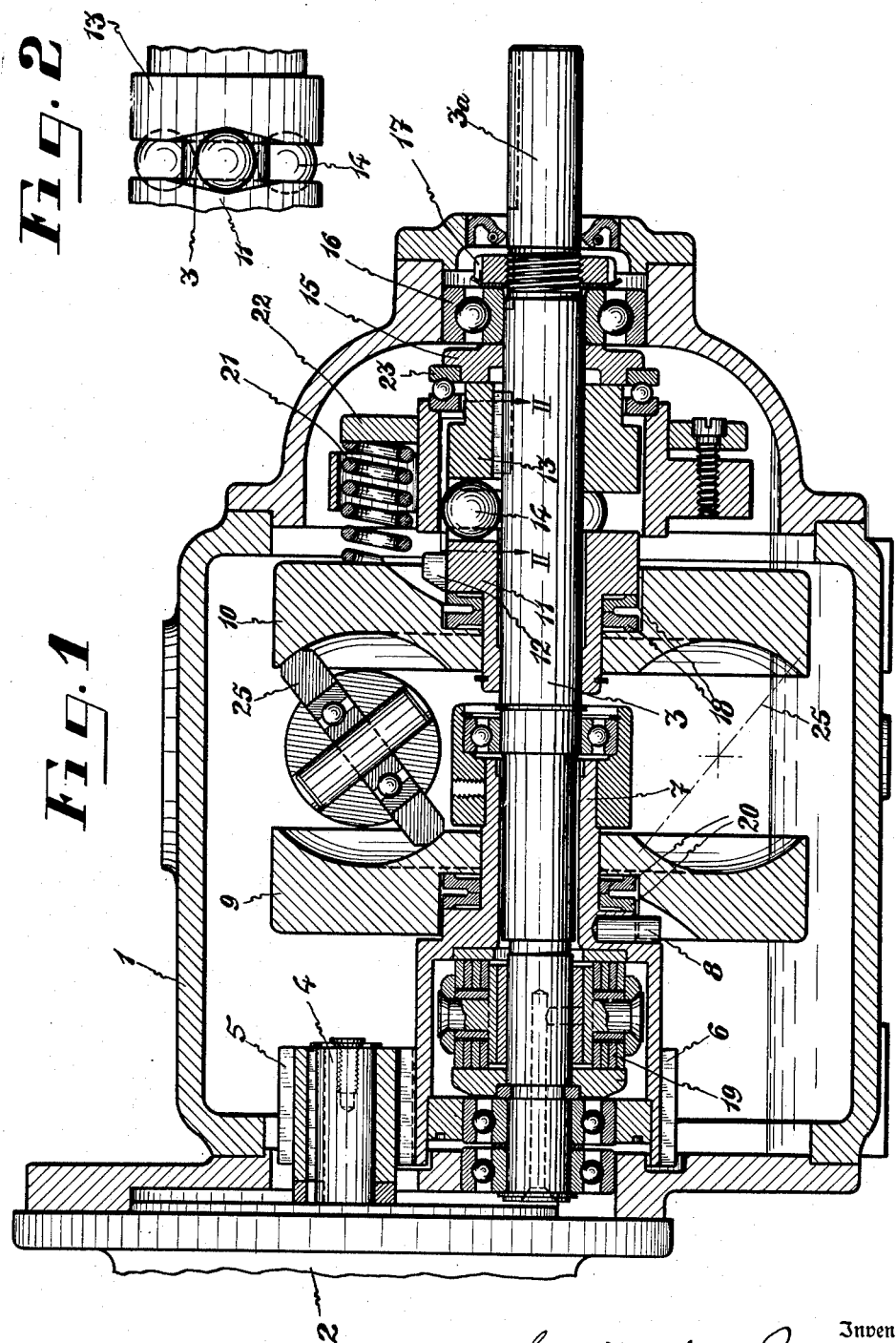

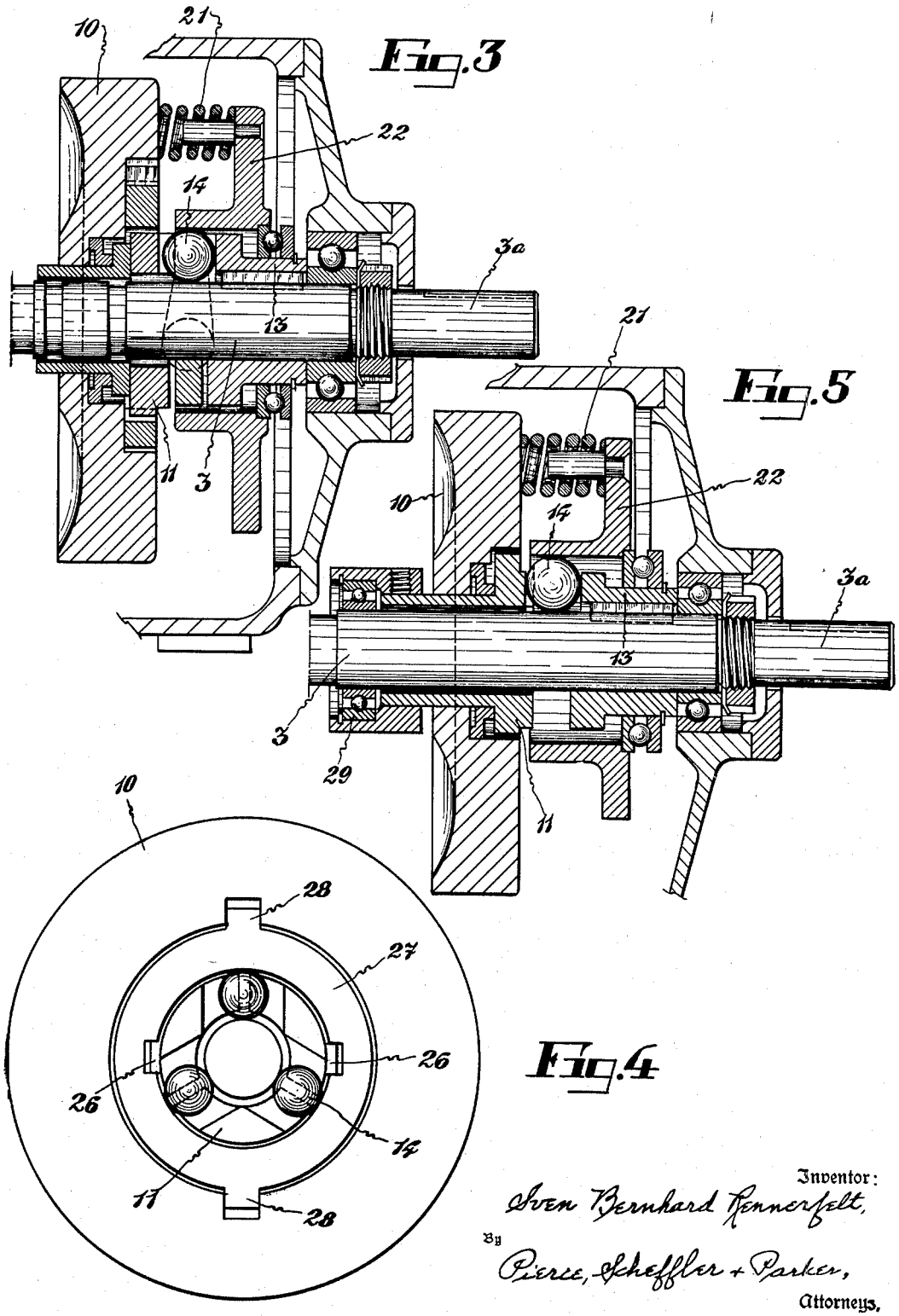

2,730,904

CONTINUOUSLY VARIABLE SPEED GEARS

Sven Bernhard Rennerfelt, Goteborg, Sweden

Application July 14, 1952, Serial No. 298,687

4 Claims. (Cl. 74—200)

The invention relates to continuously variable speed gears of the type having two coaxial, axially displaceable discs, each having an annular groove which in cross section has the shape of a circular segment and between which are rotatably mounted intermediate wheels the axes of which intersect the axis of the discs. The intermediate wheels are adjustable for various degrees of inclination relatively to the axis of the discs and by means of frictional engagement with the discs transmit the rotation of one disc to the other. Springs have usually been used for urging the discs into engagement with the intermediate wheels. These springs have to be strong enough to provide the required pressure at the points of contact under all conditions of load. If the driving shaft of the gear is connected with an electric motor driven at a constant speed it will be realized that for a given power the axial pressure required will vary as the points of contact are displaced in the radial direction. As the springs are selected for providing a sufficient axial pressure at the lowest speed of the driven shaft the axial pressure will be unnecessarily great at all other ratios of transmission. In the same way the pressure will be too great in all positions of adjustment for partial load.

It has also been suggested to provide between the driving or the driven shaft and the corresponding disc a coupling operating to provide an axial pressure dependent on the magnitude of the moment. In this way the gear will operate under more favourable conditions than the above described spring actuated gear, as the axial pressure will decrease when the load is reduced. However, if the speed of the driving shaft is constant the axial pressure when constant power is transmitted will be constant for varying speeds of the driven shaft and therefore the axial pressure will be unnecessarily great for higher speeds of the driven shaft.

In the gear according to the invention one disc is non-rotatably mounted on a driving shaft which can be connected to a source of power, preferably an electric motor, while the other disc is rotatably mounted on a driven shaft which can be connected for example to a working machine. Between the last-mentioned disc and the driven shaft is provided a coupling operating with cam surfaces or the like and adapted to press the discs against the intermediate wheels with a force dependent on the magnitude of the moment. In this way the axial pressure will be low at high speed and high at low speed of the driven shaft which is as it should be. The axial pressure will, however, vary in proportion to the square of the ratio of the radii of the points of contact on the discs, whereas theoretically it should vary linearly, and it is therefore, according to the invention preferable to provide spring means for providing a considerable initial pressure between the discs and the intermediate wheels which is indepedent of the torque. By suitably dimensioning the said spring means and by suitably shaping the cam surfaces of the coupling it is possible to obtain axial pressures which come very near those theoretically required.

In gears of the kind contemplated the couplings operating in response to the magnitude of the moment may preferably consist of balls or rollers disposed between cam surfaces or the like which press the discs against the intermediate wheels with a force dependent on the magnitude of the moment transmitted. In a device of this kind it may occur that one ball in the counpling may have to take up the whole load as a result of unavoidable inequalities in the surfaces of the cams. This may result in a bending of the shaft which at all events causes noise and may affect efficiency and reliability. In order to avoid this drawback, according to a further feature of the invention one coupling member is made movable in a plane substantially at right angles to the axis of the coupling. In this way it is made possible for the coupling members to adjust themselves in such a way that the load is distributed essentially equally over all the balls.

Some embodiments of the invention will be described in the following with reference to the accompanying drawings. Fig. 1 shows a longitudinal section through a gear according to the invention. Fig. 2 shows a detail of a coupling included in the gear shown in Fig. 1 taken on line II—II of Fig. 1. Figs. 3 and 4 show a longitudinal and a cross section respectively of a modified form of one end of the gear shown in Fig. 1. Fig. 5 shows a longitudinal section of a further modification of the same end portion.

In Fig. 1, 1 denotes a housing to one end of which an electric motor 2 is secured. In openings in the housing 1 is mounted a shaft 3 having a shaft end 3a protruding from the housing for connection for example to a tool machine.

The shaft end 4 of the electric motor 2 extends into the housing and there carries a gear wheel 5 meshing with a gear wheel 6 made integral with a tubular shaft 7 rotatably mounted on the shaft 3. From the gear wheel 6 the torque through one or more driving pins 8 is transmitted to a disc 9 having an annular groove which in section has the shape of a circular segment.

On the shaft 3 there is further rotatably mounted a disc 10 similar to the disc 9, and between the discs 9 and 10 are mounted intermediate wheels 25 the axes of which intersect the axis of the shaft 3 and in the known manner are angularly adjustable relatively to this axis.

On the shaft 3, adjacent the disc 10, is mounted a sleeve 11 which by means of one or more driving members 12 is non-rotatably connected with the disc 10. At some distance from the sleeve 11 is mounted a further sleeve 13 keyed to the shaft 3. The opposing edges of the sleeves 11 and 13 have V-shaped recesses as shown in Fig. 2. Between the sleeves, entering the said recesses, are balls 14. It will be understood that the two sleeves 11 and 13 will be urged apart when the disc 10 rotates and load is applied.

That end of the sleeve 13 which is nearest the shaft end 3a through an intermediate member 15 and the inner race of a ball bearing 16 bears against a nut 17 on the shaft 3, whereas the sleeve 11 through spring washers 18 bears against the disc 10. The shaft 3 at the other end is provided with a shoulder or collar against which bears a thrust bearing 19. Between the disc 9 and a shoulder on the tubular shaft 7 are disposed spring washers 20 of the same kind as the spring washers 18. It will be realized that in the arrangement described the discs 9 and 10 will be urged towards each other and thus press against the intermediate wheels 25 when the sleeves 11 and 13 are urged in the direction away from each other.

In order to compensate for minor irregularities in the cooperating surfaces of the discs 9 and 10 and the intermediate wheels 25 the discs are mounted on their shafts with a certain degree of play so as to allow for a minor degree of angular adjustment which is made possible by the springiness of the washers 18 and 20.

The arrangement described provides for an axial pressure between the discs the magnitude of which varies responsive to the speed of the driven shaft 3, the pressure being greatest at the lowest speed of the driven shaft. If the power transmitted is constant and the speed of the driven shaft increases the axial pressure decreases with the square of the number of revolutions, whereas the pressure theoretically should decrease linearly. In order to provide for better agreement between the desired pressure and the pressure obtained there are provided a number of springs 21 distributed over the disc 10 which are held between the disc and a ring 22 which through a thrust bearing 23 bears against the intermediate member 15. In this way the discs 9 and 10 will always be pressed against the intermediate wheels 25 with a certain constant force. The V-shaped recesses in the sleeves 11 and 13 are so shaped that when the gear is running they superpose on this constant force a pressure varying with the speed in such manner that the resulting axial pressure will be substantially that desired under all conditions of operation.

The device comprising the sleeves 11 and 13 and the balls 14 is difficult to manufacture with such precision that the same load is imposed on all the balls. On the contrary, it may easily happen that a single ball has to take up whole axial pressure which may cause bending of the shaft, noise and other disturbances. In order to eliminate this drawback, according to Figs. 3 and 4 the sleeve 11 is made movable to some extent in a direction at right angles to the shaft. As shown in Fig. 4 the sleeve 11 has two diametrically opposed projections 26 entering recesses provided in a ring 27 surrounding the sleeve, the ring in its turn being provided with projections 28 angularly displaced at 90° relatively to the projections 26. The projections 28 enter recesses in the disc 10. This arrangement is similar to an Oldham coupling. The whole arrangement thus is such that the sleeve 11 may move in a plane at right angles to the shaft 3, at the same time transmitting the torque from the disc 10 through the balls 14 and the sleeve 13 to the shaft 3.

Owing to the movability of the sleeve 11 the arrangement automatically adjusts itself to such a position that all the balls 14 share in the transmission of the torque.

Fig. 5 shows a modified form of the arrangement shown in Fig. 3. According to Fig. 5 the sleeve 11 is extended to the left and carries the disc 10 and at the left end is mounted on a ball bearing 29. This serves to provid for a certain degree of swinging movement of the right end of the sleeve.

As the displacement from the centered position can only amount to relatively small values the disc 10, without any disadvantage, can be mounted in the manner shown in Fig. 5, a certain degree of play between the disc and the sleeve 11 being assumed.

What I claim is:

1. A variable speed gear comprising in combination, a driving and a driven shaft, two coaxial axially displaceable discs having opposed annular concave surfaces, one disc being in driving connection with the driving shaft and the other disc being in driving connection with the driven shaft, intermedate wheels disposed between the discs for cooperation with the annular concave surfaces of the discs for transmitting motion between the discs, each intermediate wheel being rotatable about an axis intersecting the axis of the discs and being adjustable for angularity relatively to the axis of the discs, and coupling means for establishing the driving connection between one of the discs and the corresponding shaft, said coupling means comprising two sleeve members mounted on the shaft, at least one of the sleeve members being non-rotatably connected with the associated disc and movable on the shaft in both the radial and axial direction thereof, the sleeve members having opposing end cam surfaces and rolling members being interposed between the cam surfaces, the coupling being operative for increasing the pressure exerted by the discs on the intermediate wheels as the torque transmitted increases and vice versa.

2. A variable speed gear as claimed in claim 1 having an Oldham coupling for carrying the member movable relatively to the shaft in the axial and radial direction thereof.

3. A variable speed gear as claimed in claim 1, in which the sleeve member movable relatively to the shaft in the axial and radial direction thereof at the end remote from the cam-surfaced end is mounted on a bearing permitting slight swinging movement of the cam-surfaced end relatively to the shaft.

4. A variable speed gear as claimed in claim 1, in combination with adjustable spring means for establishing an initial pressure between the discs and the intermediate wheels independent of the torque transmitted by said coupling means; said adjustable spring means comprising springs bearing against one of said discs, a backing ring for said springs, and means for adjusting said backing ring axially to establish said initial pressure.

References Cited in the file of this patent

UNITED STATES PATENTS

| | | |
|---|---|---|
| 1,774,175 | Erban | Aug. 26, 1930 |
| 1,947,044 | Gove | Feb. 13, 1934 |
| 1,999,544 | Madle | Apr. 30, 1935 |
| 2,134,225 | Christiansen | Oct. 25, 1938 |
| 2,157,259 | Delaval-Crow | May 9, 1939 |
| 2,325,502 | Georges | July 27, 1943 |